United States Patent
Godwin et al.

(10) Patent No.: US 12,481,448 B2
(45) Date of Patent: Nov. 25, 2025

(54) STORAGE DEVICES HAVING MULTI-CHANNEL CAPACITIVE SENSORS FOR DETECTING GESTURE BASED COMMANDS

(71) Applicant: Sandisk Technologies, Inc., Milpitas, CA (US)

(72) Inventors: Sudhan Immanuel Godwin, Bangalore (IN); Anil Kumar Kolar Narayanappa, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 29 days.

(21) Appl. No.: 18/231,718

(22) Filed: Aug. 8, 2023

(65) Prior Publication Data
US 2024/0220147 A1  Jul. 4, 2024

Related U.S. Application Data

(60) Provisional application No. 63/435,768, filed on Dec. 28, 2022.

(51) Int. Cl.
*G06F 3/06* (2006.01)
*G06F 3/044* (2006.01)

(52) U.S. Cl.
CPC .............. *G06F 3/065* (2013.01); *G06F 3/044* (2013.01); *G06F 3/0607* (2013.01); *G06F 3/0679* (2013.01)

(58) Field of Classification Search
CPC ........ G06F 3/065; G06F 3/044; G06F 3/0607; G06F 3/0679
See application file for complete search history.

(56) References Cited

U.S. PATENT DOCUMENTS

| | | | |
|---|---|---|---|
| 7,146,667 B2 | 12/2006 | Elsener | |
| 9,176,826 B1* | 11/2015 | Smith | G06F 8/61 |
| 9,823,703 B2 | 11/2017 | Eremenko et al. | |
| 10,488,993 B2 | 11/2019 | Novet | |
| 2006/0227123 A1* | 10/2006 | Bychkov | H05K 5/0278 |
| | | | 345/204 |
| 2007/0130413 A1* | 6/2007 | Yetukuri | G06F 3/0679 |
| | | | 711/115 |
| 2008/0140873 A1* | 6/2008 | Stemmer | G06F 13/409 |
| | | | 710/1 |
| 2009/0184932 A1* | 7/2009 | Alten | G06F 13/409 |
| | | | 345/173 |
| 2010/0019032 A1* | 1/2010 | Kim | G06Q 20/357 |
| | | | 235/380 |
| 2011/0070834 A1* | 3/2011 | Griffin | G06K 7/10237 |
| | | | 235/492 |

(Continued)

*Primary Examiner* — Md Saiful A Siddiqui
(74) *Attorney, Agent, or Firm* — Patterson + Sheridan, LLP

(57) ABSTRACT

Systems and methods are disclosed for providing multi-channel capacitive sensors for detecting user gestures. In certain embodiments, a data storage device includes a non-volatile memory; a plurality of metal pieces configured to form one or more heat sinks of the data storage device and to form a plurality of capacitive pads of a capacitive sensor configured to detect a user gesture; and a controller configured to: detect a gesture of a user in proximity of the plurality of capacitive pads using the capacitive sensor; and perform a command associated with the data storage device based on the detected gesture.

19 Claims, 13 Drawing Sheets

(56) References Cited

U.S. PATENT DOCUMENTS

| | | | |
|---|---|---|---|
| 2015/0076237 A1* | 3/2015 | Florek | G06K 19/07345 |
| | | | 29/846 |
| 2015/0234499 A1* | 8/2015 | Hu | G06F 3/03547 |
| | | | 345/174 |
| 2016/0203103 A1* | 7/2016 | Yu | G06F 12/0246 |
| | | | 711/103 |
| 2018/0046421 A1* | 2/2018 | Mazurek | G06F 12/0246 |
| 2019/0155437 A1* | 5/2019 | Chia | G06F 3/0412 |
| 2022/0075427 A1* | 3/2022 | Palmor | G06F 1/1647 |
| 2022/0083635 A1 | 3/2022 | Bell | |
| 2022/0147974 A1* | 5/2022 | Law | G06F 21/34 |
| 2023/0179589 A1* | 6/2023 | Kopack | H04L 63/18 |
| | | | 726/4 |

\* cited by examiner

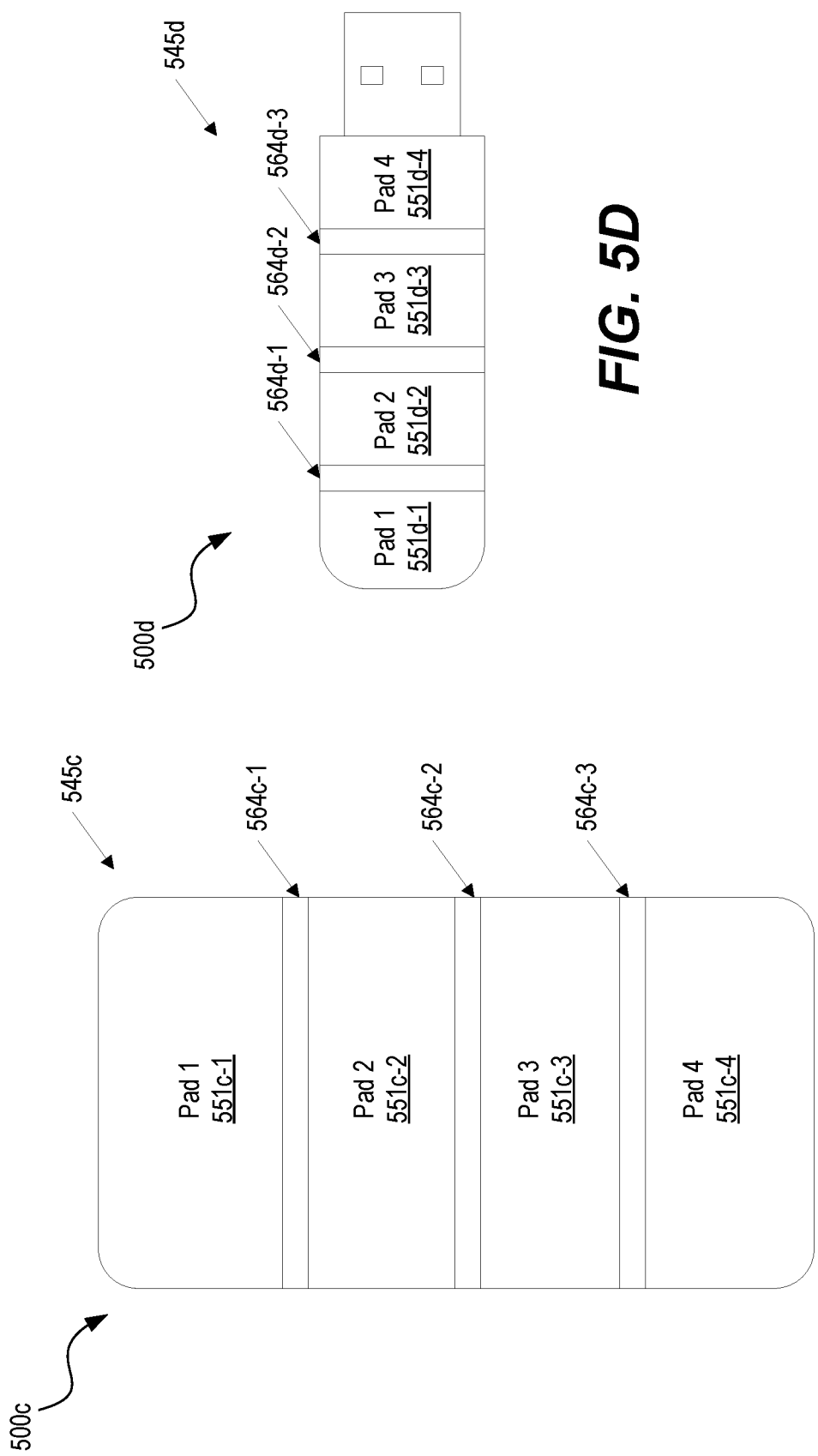

STORAGE DEVICES HAVING MULTI-CHANNEL CAPACITIVE SENSORS FOR DETECTING GESTURE BASED COMMANDS

CROSS-REFERENCE TO RELATED APPLICATION(S)

This application claims the benefit of U.S. Provisional Patent Application No. 63/435,768, filed Dec. 28, 2022, entitled "STORAGE DEVICES HAVING MULTI-CHANNEL CAPACITIVE SENSORS FOR DETECTING GESTURE BASED COMMANDS," which is hereby expressly incorporated by reference herein in its entirety for all purposes.

BACKGROUND

Field

The present disclosure relates to data storage systems. In particular, the present disclosure relates to processing data requests in data storage systems.

Description of Related Art

Data storage systems/devices can process various data requests from hosts. For example, a host can receive user commands or input to initiate data requests and can send the data requests to a data storage system/device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5C is a block diagram illustrating an example storage device for providing multi-channel capacitive sensors for detecting gesture-based commands, in accordance with one or more embodiments.

FIG. 5D is a block diagram illustrating an example storage device for providing multi-channel capacitive sensors for detecting gesture-based commands, in accordance with one or more embodiments.

DETAILED DESCRIPTION

Figure 1:
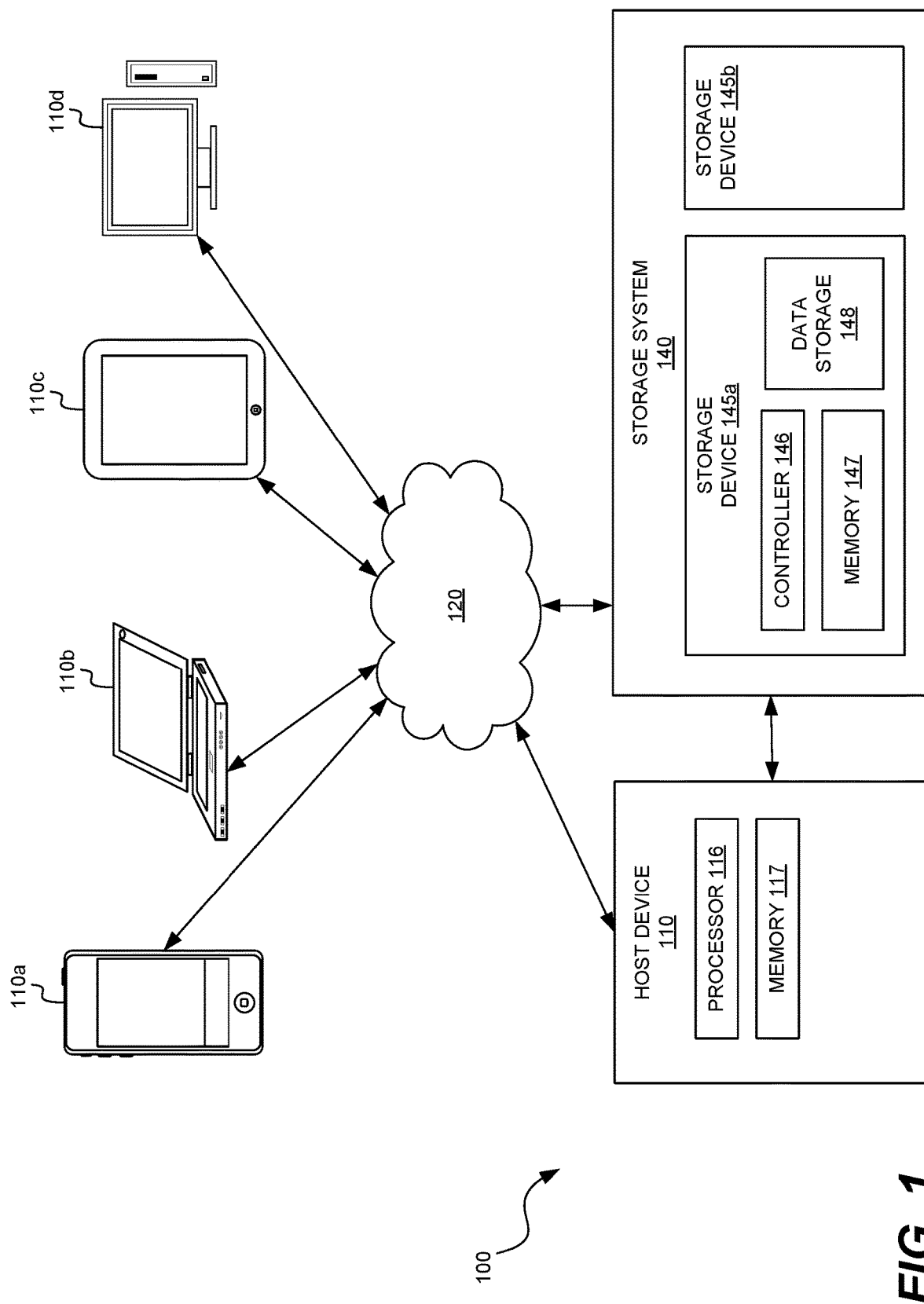
FIG. 1 illustrates an example system architecture for an example storage system relating to providing multi-channel capacitive sensors for detecting gesture-based commands, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Storage Devices Having Multi-Channel Capacitive Sensors for Detecting Gesture Based Commands Built from Heat Sinks A data storage system/device can process various data requests from a host. For example, a user can provide user input or commands at a host to initiate data requests, and the host can send the data requests to a data storage system/device. Examples of data storage systems/devices can include removable devices, such as external solid state drives (SSD), Universal Serial Bus (USB) flash drives, Secure Digital (SD) cards, Micro Secure Digital (uSD) cards, CompactFlash, CFast, CFexpress, Redundant Array of Independent Disks (RAID) controllers, etc. Such devices can rely on user commands from a host to perform any data operations, such as initiation of data transfer to and/or from the data storage device. For example, user input at a host is generally needed for a data storage device to perform data operations. However, it may be convenient for users to be able to request data operations to a data storage device without having to provide input through a host. In addition, authentication based on Fast IDentity Online (FIDO) can require contact input from a user (e.g., pushing a button or touching a touch sensor), and authentication based on Bluetooth can require use of another device, such as a host or a mobile phone. In these cases, it may also be convenient for users to have other ways to interact with the data storage device to perform related operations.

In order to address these and other challenges, a storage system/device according to certain aspects can implement multi-channel capacitive sensors for detecting gesture-based commands. For example, a storage device can provide a multi-channel capacitive sensor that includes multiple capacitive pads to detect user gestures. Different gestures may be associated with different commands and/or data operations. Therefore, a user can request data operations to a storage device without having to provide input through a host. Gestures may also be used for FIDO authentication, Bluetooth authentication, etc. In some cases, it may be difficult to implement a capacitive sensor for sensing user gestures in an external solid state drive due to thermal challenges. For instance, many external SSDs can be waterproof and may not include air vents or fans to cool the drives. Such external SSDs can include several metal layers as heat sinks to dissipate the heat away from the drives. However, numerous metal layers in an external SSD can make it difficult to implement a multi-channel capacitive sensor for detecting gestures within the SSD, for example, due to interference with electric fields of capacitive pads. Accordingly, pieces of a heat sink in an external SSD can be used to form a multi-channel capacitive sensor and can be used to form capacitive pads of the multi-channel capacitive sensor. Using metal pieces of heat sinks to form capacitive sensors can also be applicable to other storage devices, in addition to external SSDs. In this way, a storage device can be more compact and can manage thermal requirements. Details relating to the storage system/device including multi-channel capacitive sensors for detecting gesture-based commands are provided below.

FIG. 1 illustrates an example system architecture 100 for an example storage system 140 relating to providing multi-channel capacitive sensors for detecting user gestures, in accordance with one or more embodiments. The architecture 100 can include one or more client computing devices or hosts 110. A client computing device 110 can include a processor 116 and a memory 117. The architecture 100 can also include the storage system 140 for providing multi-channel capacitive sensors. The storage system 140 can include one or more storage devices 145. A client computing device 110 can be coupled to the storage system 140 and/or the storage device 145. A client computing device 110 may be coupled directly to the storage system 140 and/or the storage device 145. In some cases, a client computing device 110 may be coupled to the storage system 140 and/or the storage device 145 via a network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

As mentioned above, the storage system 140 can include one or more storage devices 145. A storage device 145a can include a controller 146, a memory 147, and data storage 148 (e.g., non-volatile memory). A storage device 145b can also include similar components. The storage system 140 may store data and/or data objects that may be accessed by the client computing devices 110. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and random-access memory (RAM) technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

In some embodiments, a "host" can refer to a system or device from which data on a storage system or device is accessed or requested. For instance, a client computing device 110 can be a host. In some embodiments, a "device" can refer to a storage system or device from which data is obtained, for example, to provide to a host.

According to certain embodiments, the storage system 140 and/or the storage device(s) 145 can be configured to provide multi-channel capacitive sensors for detecting user gestures, as described herein. For illustrative purposes, multi-channel capacitive sensors for detecting user gestures are described in connection with a storage device 145. The storage device 145 can have a multi-channel capacitive sensor that includes multiple capacitive pads that are configured to detect user gestures. User gestures can include various types of gestures that can be performed by a user. For instance, user gestures may be performed by a user's hand in proximity of capacitive pads. As an example, capacitive pads can be arranged in series and can detect a swipe in one dimension (e.g., left-to-right, right-to-left). As another example, capacitive pads can be arranged as a matrix and can detect a swipe in two dimensions (e.g., left-to-right, right-to-left, top-down, down-top, etc.). Various gestures can be associated with different commands such that the storage device 145 can perform an associated command in response to detecting a particular gesture. Gestures may also be used to perform FIDO authentication or Bluetooth authentication, for example, to provide seamless user experience and facilitate user interaction. The storage device 145 can include one or more multi-channel capacitive sensors, depending on the embodiment.

Removable storage devices, such as external SSDs, may include a number of metal layer or materials to function as one or more heat sinks in order to address thermal requirements. For instance, removable devices may need to be compact and in some cases waterproof, and may not include air vents or fans. Since metal layers or materials can interfere with electric fields of capacitive pads, it can be challenging to implement a multi-channel capacitive sensor within a removable device. Also, additional materials would be added to the removable device to implement the capacitive sensor, increasing the size of the removable device. Accordingly, a storage device 145 can implement a multi-channel capacitive sensor using a heat sink. For instance, the heat sink can be partitioned into multiple metal pieces and can be used to form a multi-channel capacitive sensor. In an example, the heat sink may be a metal piece embedded in or placed near a plastic lid and can be partitioned into multiple metal pieces that are electrically insulated from each other to form capacitive pads of the multi-channel capacitive sensor. For instance, the heat sink may be embedded in the lid such that edges of the heat sink are surrounded or covered by edges of the lid in part or in whole. In another example, the heat sink may be a metal lid itself, and the metal lid can be partitioned into multiple metal pieces that are electrically insulated from each other to form capacitive pads of the multi-channel capacitive sensor. For example, the multiple metal pieces can form a capacitive array. In this manner, a multi-channel capacitive sensor can be included in a removable device without adding additional metal layers or materials in the storage device 145, and the storage device 145 can be more compact while managing thermal requirements. Examples of removable devices can include external SSDs, USB flash drives, SD cards, uSD cards, CompactFlash, CFast, CFexpress, RAID controllers, etc. For illustrative purposes, using heat sinks to implement multi-channel capacitive sensors is explained in connection with removable devices, but can be applicable to other types of storage devices as well. Details relating to providing multi-channel capacitive sensors for detecting user gestures are described below, for example, in connection with FIGS. 2-6.

Figure 2:
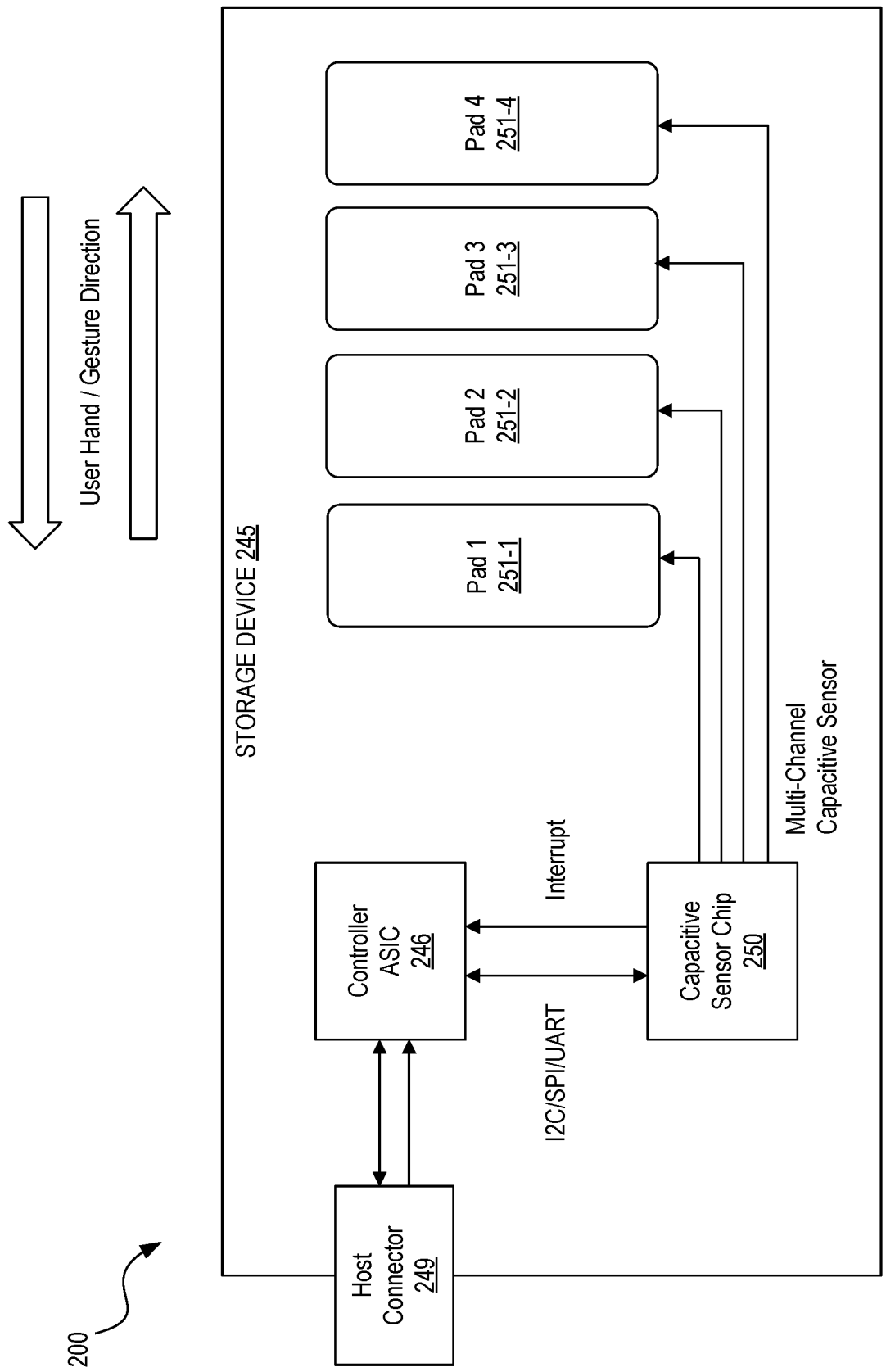
FIG. 2 is a block diagram illustrating an example storage device for providing multi-channel capacitive sensors for detecting gesture-based commands, in accordance with one or more embodiments.

FIG. 2 is a block diagram 200 illustrating an example storage device 245 for providing multi-channel capacitive sensors for detecting gesture-based commands, in accordance with one or more embodiments. In some embodiments, components of FIG. 2 can be similar to components of FIG. 1 having similar names and/or reference numbers. For example, the storage device 245 can be similar to a storage device 145 in FIG. 1. Certain details relating to the block diagram 200 are described above in connection with FIG. 1.

The storage device 245 can communicate with a host, such as a client computing device. In the example of FIG. 2, the storage device 245 can be an external SSD. Multi-channel capacitive sensors for detecting user gestures are described in connection with an external SSD for illustrative purposes, but can be implemented in other types of storage devices. As shown in FIG. 2, the storage device 245 can include a host connector 249, a controller application-specific integrated circuit (ASIC) chip 246, a capacitive sensor chip 250, and a plurality of capacitive pads or electrodes 251. The storage device 245 can be connected to a host through the host connector 249. The controller chip 246 can receive commands from the host through the host connector 249. The capacitive sensor chip 250 can be mounted on a printed circuit board assembly (PCBA) of the storage device 245. The capacitive sensor chip 250 can communicate with the controller chip 246 via Serial Peripheral Interface (SPI), Inter-Integrated Circuit (I2C), Universal Asynchronous Receiver-Transmitter (UART) or a similar interface. There can be an interrupt line from the capacitive sensor chip 250 to the controller chip 246 to indicate when a user's hand is close to the storage device 245. The capacitive sensor chip 250 can drive multiple capacitive pads 251. The example of FIG. 2 shows four (4) capacitive pads 251: Pad 1 251-1, Pad 2 251-2, Pad 3 251-3, and Pad 4 251-4. The capacitive pads 251 are arranged in series or in a row and can detect user gestures in one dimension. For instance, the capacitive sensor chip 250 can detect gestures from left-to-right or right-to-left. As an example, the capacitive pads 251 can be made of copper. The capacitive pads 251 may be made of any suitable material. The capacitive pads 251 may also be arranged in two or more dimensions such that the capacitive pads 251 can detect user gestures in two or more dimensions. For instance, the capacitive pads 251 can be arranged in a matrix or multiple rows to detect gestures in two dimensions. The capacitive pads 251 can also be considered to be implemented in rows and/or columns or in an array. The storage device 245 and/or the controller chip 246 may include additional or fewer components, depending on the embodiment. One or more components of the storage device 245 may be implemented separately, or may be combined or integrated, depending on the embodiment. For instance, the controller chip 246 may include functionalities of the capacitive sensor chip 250 in some cases. Some or all of functionalities of the capacitive sensor chip 250 may be integrated into the controller 246, depending on the embodiment.

The storage device 245 may detect user gestures within a predetermined proximity or distance from the storage device 245. For instance, the storage device 245 may detect user gestures that are 0-5 centimeters (cm) from the top of the storage device 245. In the example of FIG. 2, if a user gestures by swiping the user's hand in the air from left to right, Pad 1 251-1 will sense the user's hand first, followed by Pad 2 251-2, Pad 3 251-3, and Pad 4 251-4, respectively. Similarly, in the case of a right-to-left swipe, Pad 4 251-4 will sense the user's hand first, followed by Pad 3 251-3, Pad 2 251-2, and Pad 1 251-1, respectively. Information relating to which capacitive pad senses the user's hand can be used to determine in which direction the user gesture is performed. For instance, which capacitive pad senses the user's hand first and/or a timing or a sequential order in which the capacitive pads sense the user's hand can be used to determine whether the user gesture is a left-to-right swipe or a right-to-left swipe.

Different meanings or commands can be assigned to different gestures. In an example, a left-to-right swipe can be associated with a full file copy of contents of the storage device 245 to the host, and the storage device 245 can automatically start copying the storage device 245 data to the host in response detecting a left-to-right swipe. As another example, a right-to-left swipe can be associated with a full file copy of contents of the host to the storage device 245 for backup, and the storage device 245 can automatically start copying the host data to the storage device 245 in response to detecting the right-to-left swipe. Source and/or target locations (e.g., directories) may be predefined or configured in settings. Additional examples of gestures and associated commands are included below:

TABLE 1

Example Gestures and Commands

| Gesture | Command to Execute |
| --- | --- |
| Gesture 1 (Swipe Left to Right) | Go to sleep |
| Gesture 2 (Swipe Right to Left) | Turn on Bluetooth |
| Gesture 3 (Swipe Top to Bottom) | Reduce performance to save power |
| Gesture 4 (Swipe Bottom to Top) | Increase performance to maximum |
| Gesture 5 (Place Hand on Top of Drive) | Stop all data transfer predicting an unplug event |

Above examples are provided for illustrative purposes, and many variations are possible.

Gestures may also be used for FIDO or Bluetooth authentication. FIDO protocols can use standard public key cryptography techniques to provide stronger authentication. A user's device can create a new key pair, and can retain the private key and register the public key, for example, with a service. Authentication can be done by the device proving possession of the private key. The user's private keys may be used only after they are unlocked on the device by the user. The unlock can be accomplished in different ways, including pressing a button, touching a touch sensor, etc. In some cases, a gesture can replace the function of physical user input for FIDO, such as contact with a push button or a touch sensor. For FIDO authentication, a user may be prompted to push a button or contact a touch sensor on a device to release key information. Instead of physical contact input, a user may perform a particular gesture in proximity of the storage device 245 to release the key information. In this manner, a user can perform FIDO authentication on the storage device 245 using a gesture. Therefore, in some cases, components used for physical contact input for FIDO authentication, such as a push button or a touch sensor, may be eliminated from the storage device 245. In certain cases, a gesture can be used for Bluetooth based authentication, such as Bluetooth Low Energy (BLE). For Bluetooth based unlock, a user can use a host or a mobile phone to push a notification to authenticate and grant access. Instead of using the host or the mobile phone, a user may perform a particular gesture in proximity of the storage device 245 for Bluetooth-based unlock scenarios. In this way, a user may use gestures to facilitate various types of authentications, for example, having to provide a manual input or using a host or another device.

According to certain aspects, capacitive pads 251 for a multi-channel capacitive sensor may be implemented in or near a lid of a storage device 245, such as an external SSD. Having the capacitive pads 251 close to the lid can make it more effective for detecting user gestures as well as reduce interference by other metal layers within the storage device 245, for example, used as heat sinks. For instance, the distance between a heat sink layer in which capacitive pads are implemented, such as the lid, and other metal layers in the storage device 245 may be increased. In some embodiments, the lid of the storage device 245 can be made of plastic, and the capacitive pads 251 can be metal pieces embedded in or placed near the lid that also form a heat sink. In certain embodiments, the lid of the storage device 245 can be made of metal, and the capacitive pads 251 can be formed from the metal lid by partitioning the lid into multiple metal pieces and electrically isolating them with other materials, such as plastic. The above examples are described for illustrative purposes, and the capacitive pads 251 may be implemented in various positions and locations within the storage device 245 as appropriate.

As mentioned above, a storage device 245 may include a number of metal layers that are used as heat sinks, which may affect electric fields of capacitive pads 251. For example, a storage device 245, such as an external SSD, can include one or more of an aluminum heat sink, a nano carbon copper tape, and a thermal interface material. According to certain aspects, calibration can be performed to compensate for interference of such metal layers with electric fields of capacitive pads 251. For example, when a storage device 245 is plugged in to a host, calibration can be performed to determine initial capacitance values for capacitive pads 251 and set such values as ground zero or reference capacitance values. Subsequent changes from the initial capacitance values can be used to detect a user gesture. Calibration can take into account other metal objects in the environment, such as a table, a computer, a laptop, etc. Calibration is described in more detail below.

Figure 3A:
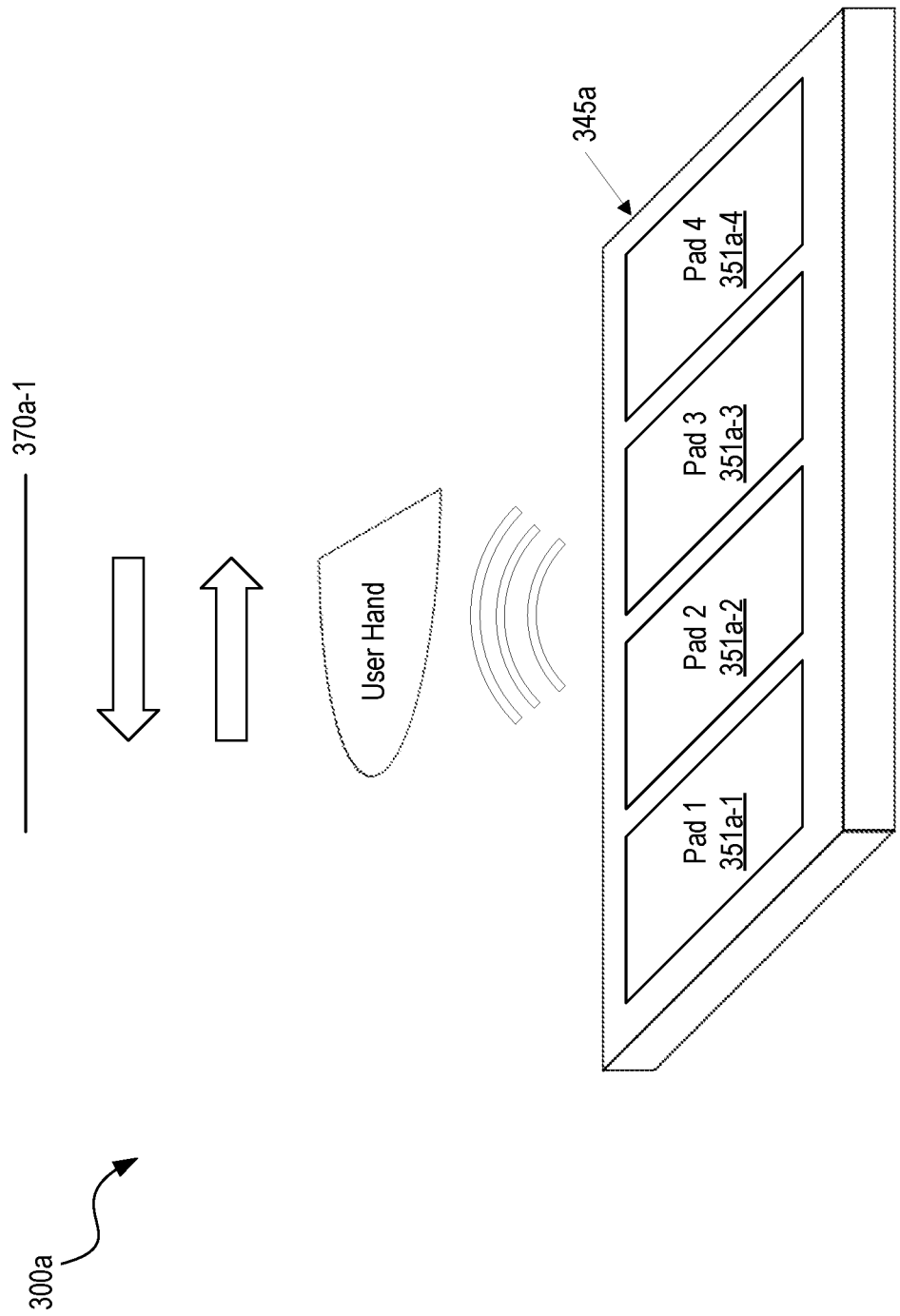
FIG. 3A is a block diagram illustrating an example storage device for providing multi-channel capacitive sensors for detecting gesture-based commands, in accordance with one or more embodiments.

FIG. 3A is a block diagram 300a illustrating an example storage device 345a for providing multi-channel capacitive sensors for detecting gesture-based commands, in accordance with certain embodiments. In some embodiments, components of FIG. 3A can be similar to components of FIGS. 1-2 having similar names and/or reference numbers. For example, the storage device 345a can be similar to the storage device 145, 245 in FIGS. 1-2. Certain details relating to the block diagram 300a are described above in connection with FIGS. 1-2.

In the example of FIG. 3A, the storage device 345a, such as an external SSD, includes four (4) capacitive pads 351a for detecting user gestures: Pad 1 351a-1, Pad 2 351a-2, Pad 3 351a-3, and Pad 4 351a-4. For instance, the capacitive pads 351a can be implemented with a heat sink embedded in or placed near a lid of the storage device 345a. A heat sink embedded in or placed near the lid of the storage device 345a can be partitioned into multiple pieces to form the capacitive pads 351a. The capacitive pads 351a can be on the underside of the lid. The capacitive pads 351a are arranged in a row or in series and can detect user gestures in one dimension 370a-1 (e.g., x axis or horizontal axis). The capacitive pads 351a can detect gestures in different directions within the one dimension 370a-1, e.g., a user gesture from left to right or from right to left. Each gesture can be associated with a particular command relating to the storage device 345a. In response to detecting a gesture, the storage device 345a can determine an associated command and perform the command as appropriate.

Figure 3B:
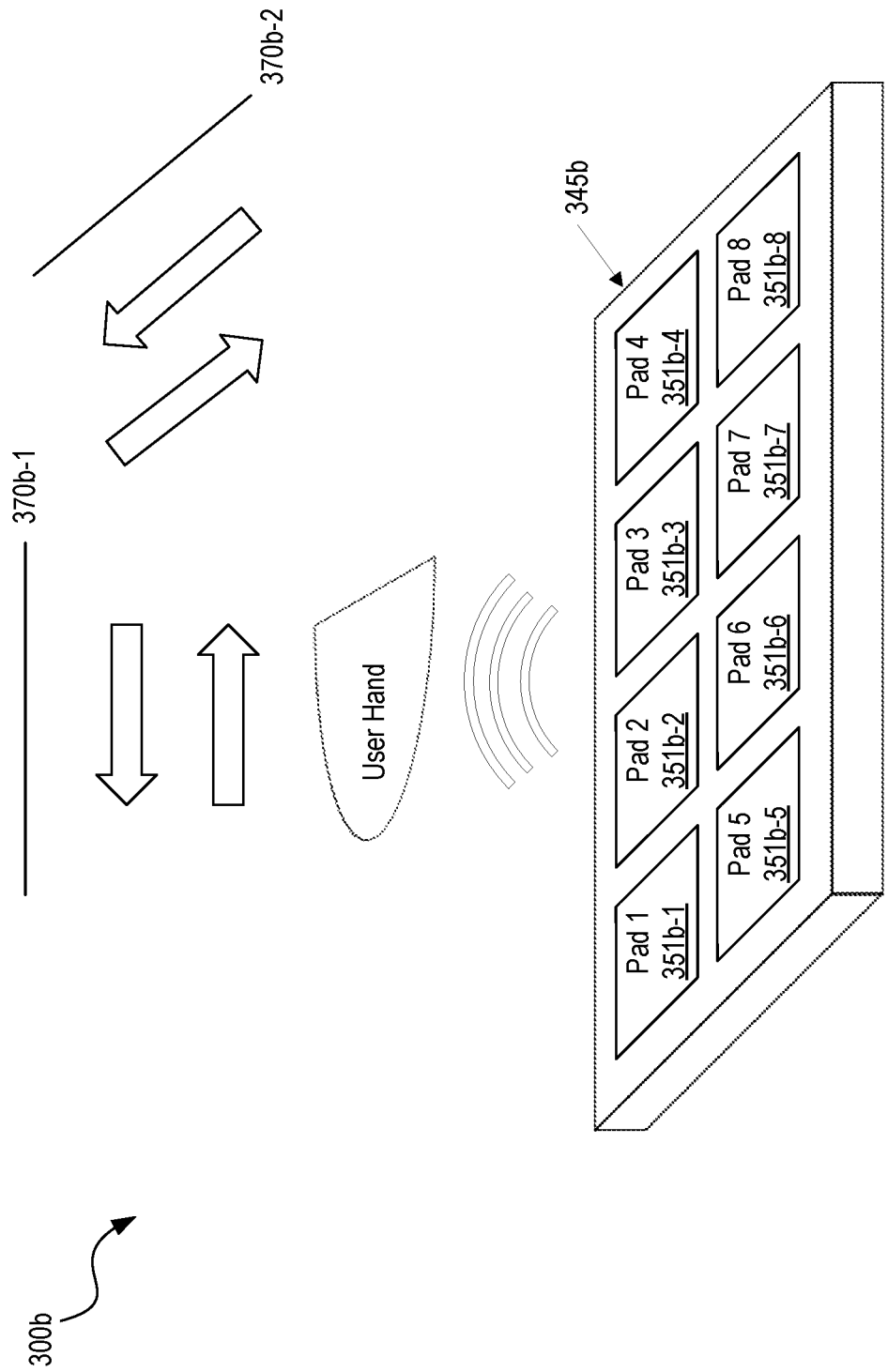
FIG. 3B is a block diagram illustrating an example storage device for providing multi-channel capacitive sensors for detecting gesture-based commands, in accordance with one or more embodiments.

FIG. 3B is a block diagram 300b illustrating an example storage device 345b for providing multi-channel capacitive sensors for detecting gesture-based commands, in accordance with certain embodiments. In some embodiments, components of FIG. 3B can be similar to components of FIGS. 1-3A having similar names and/or reference numbers. For example, the storage device 345b can be similar to the storage device 145, 245, 345a in FIGS. 1-3A. Certain details relating to the block diagram 300b are described above in connection with FIGS. 1-3A.

In the example of FIG. 3B, the storage device 345b, such as an external SSD, includes eight (8) capacitive pads 351b for detecting user gestures: Pad 1 351b-1, Pad 2 351b-2, Pad 3 351b-3, Pad 4 351b-4, Pad 5 351b-5, Pad 6 351b-6, Pad 7 351b-7, and Pad 8 351b-8. For instance, the capacitive pads 351b can be implemented with a heat sink embedded in or placed near a lid of the storage device 345b. A heat sink embedded in or placed near the lid of the storage device 345b can be partitioned into multiple pieces to form the capacitive pads 351b. The capacitive pads 351b can be on the underside of the lid. The capacitive pads 351b are arranged in multiple rows or in a matrix and can detect user gestures in two dimensions (e.g., x and y axes, or horizontal and vertical axes). The capacitive pads 351b can detect gestures in different directions within each dimension. In a first dimension 370b-1 (e.g., along x axis or horizontal axis), the capacitive pads 351b can detect a user gesture from left to right or from right to left. In a second dimension 370b-2 (e.g., along y axis or vertical axis), the capacitive pads 351b can detect a user gesture from top to bottom or from bottom to top. Each gesture can be associated with a particular command relating to the storage device 345b. In response to detecting a gesture, the storage device 345b can determine an associated command and perform the command as appropriate. The examples of FIGS. 3A-3B are provided for illustrative purposes, and capacitive pads 351 may be implemented in any suitable manner or configuration. For instance, if capacitive pads 351 are configured in three dimensions, the capacitive pads 351 may be able to detect user gestures in three dimensions.

Figure 4A:
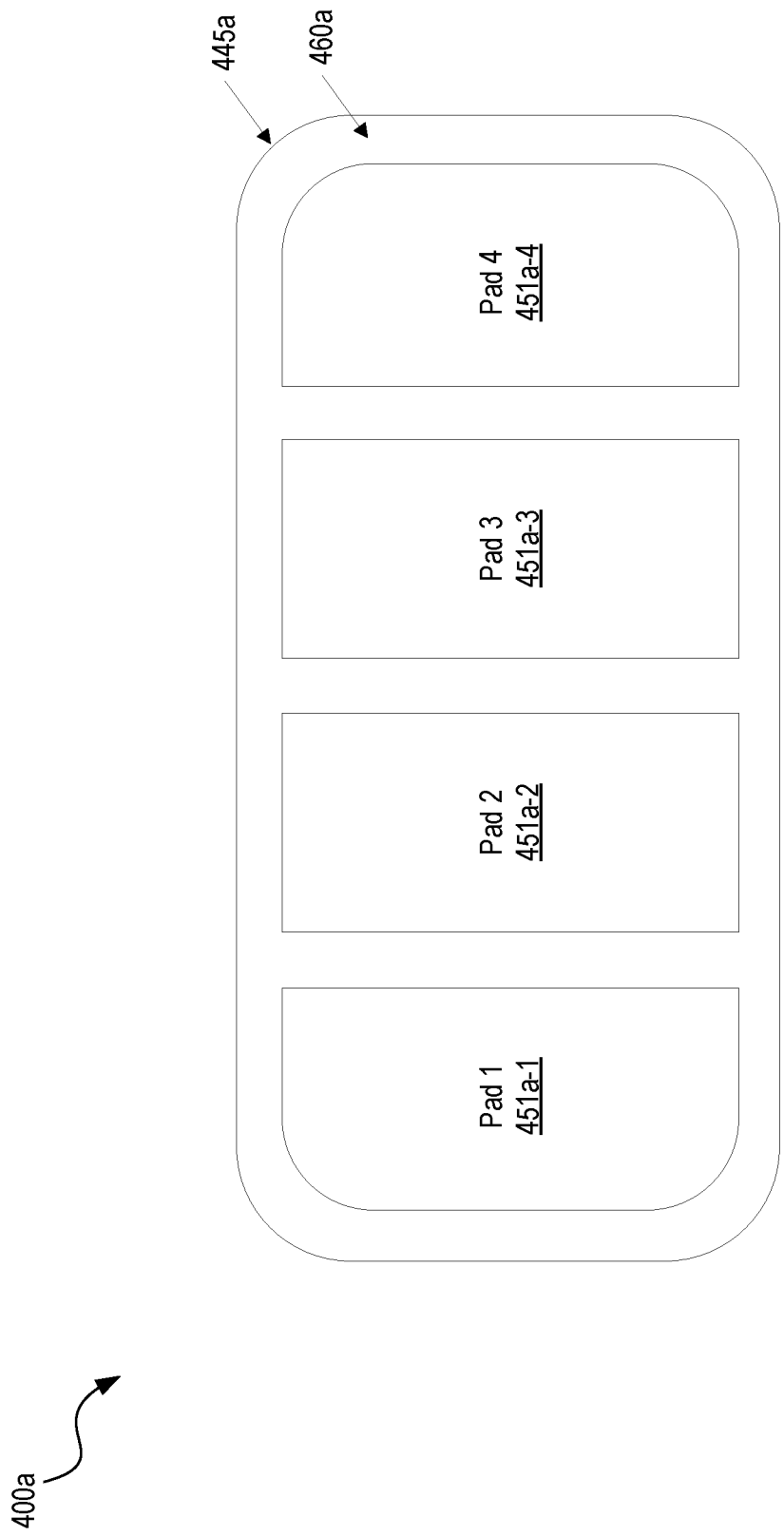
FIG. 4A is a block diagram illustrating an example storage device for providing multi-channel capacitive sensors for detecting gesture-based commands, in accordance with one or more embodiments.

FIG. 4A is a block diagram 400a illustrating an example storage device 445a for providing multi-channel capacitive sensors for detecting gesture-based commands, in accordance with certain embodiments. In some embodiments, components of FIG. 4A can be similar to components of FIGS. 1-3B having similar names and/or reference numbers. For example, the storage device 445a can be similar to the storage device 145, 245, 345 in FIGS. 1-3B. Certain details relating to the block diagram 400a are described above in connection with FIGS. 1-3B.

In the example of FIG. 4A, the storage device 445a, such as an external SSD, includes four (4) capacitive pads 451a for detecting user gestures: Pad 1 451a-1, Pad 2 451a-2, Pad 3 451a-3, and Pad 4 451a-4. For instance, the capacitive pads 451a can be implemented with a heat sink embedded in or placed near a lid 460a of the storage device 445a. A heat sink embedded in or placed near the lid 460a of the storage device 445a can be partitioned into multiple pieces to form the capacitive pads 451a. The capacitive pads 451a can be on the underside of the lid 460a. The example of FIG. 4A shows the underside of the lid 460a of the storage device 445a. The capacitive pads 451a are arranged in a row or in series and can detect user gestures in one dimension. The capacitive pads 451a can detect gestures in different directions within the one dimension, e.g., a user gesture from left to right or from right to left. Each gesture can be associated with a particular command relating to the storage device 445a. In response to detecting a gesture, the storage device 445a can determine an associated command and perform the command as appropriate.

Figure 4B:
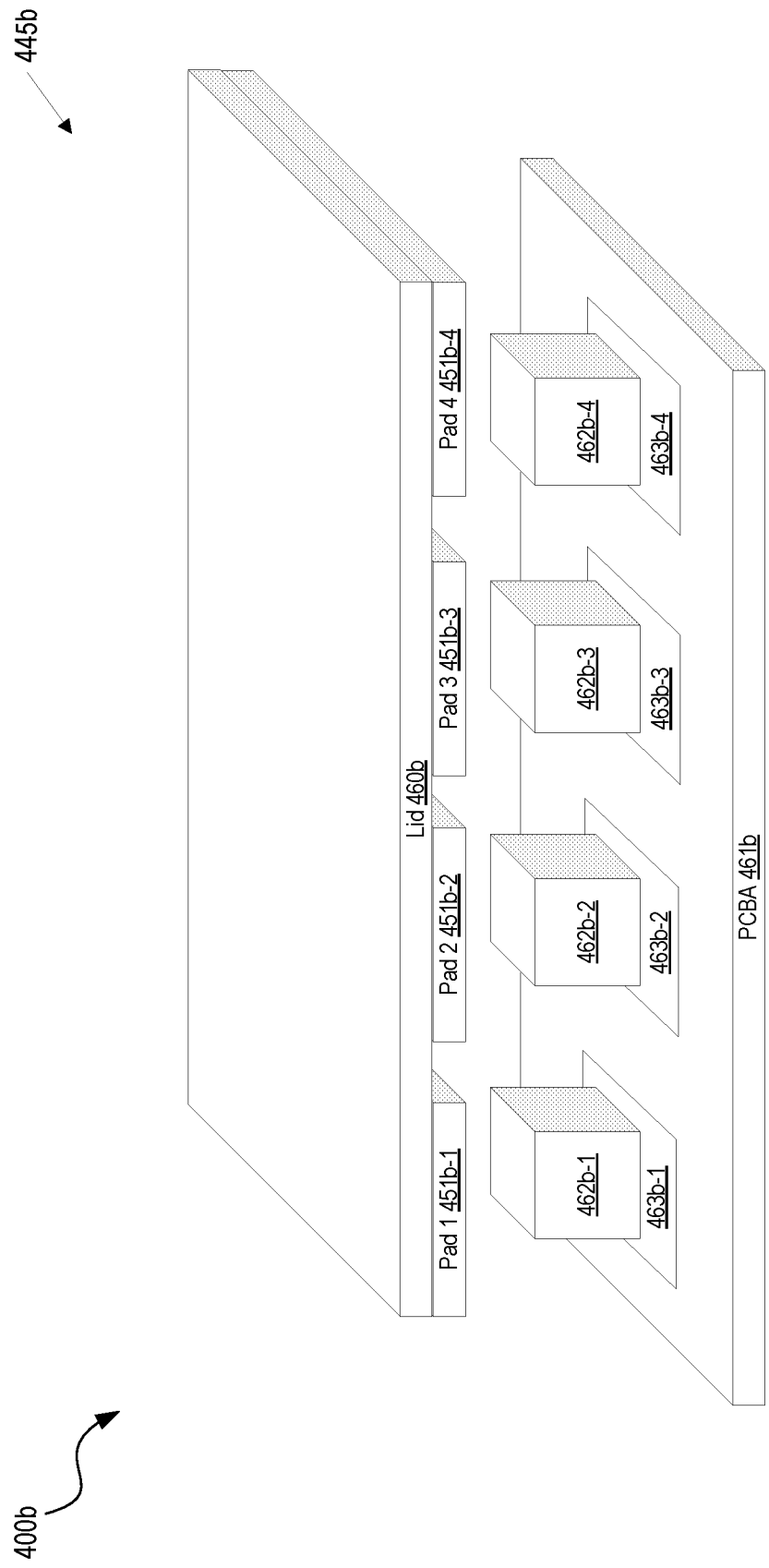
FIG. 4B is a block diagram illustrating an example storage device for providing multi-channel capacitive sensors for detecting gesture-based commands, in accordance with one or more embodiments.

FIG. 4B is a block diagram 400b illustrating an example storage device 445b for providing multi-channel capacitive sensors for detecting gesture-based commands, in accordance with certain embodiments. In some embodiments, components of FIG. 4B can be similar to components of FIGS. 1-4A having similar names and/or reference numbers. For example, the storage device 445b can be similar to the storage device 145, 245, 345, 445a in FIGS. 1-4A. Certain details relating to the block diagram 400b are described above in connection with FIGS. 1-4A.

FIG. 4B can show another view of an example storage device, such as the storage device 445a in FIG. 4A. For instance, FIG. 4B shows a perspective view of different components or layers within a storage device 445b, such as an external SSD. Under the lid 460b, a number of metal pieces partitioned from a heat sink can form multiple capacitive pads 451b of a multi-channel capacitive sensor in the storage device 445b. The storage device 445b includes four (4) capacitive pads 451b: Pad 1 451b-1, Pad 2 451b-2, Pad 3 451b-3, and Pad 4 451b-4. The metal pieces forming the capacitive pads 451b are electrically isolated from each other. The capacitive pads 451b can be electrically connected to exposed copper 463b on a PCBA 461b of the storage device 445b. For example, the capacitive pads 451b can be connected to the exposed copper 463b by electrically conductive sponges 462b. For instance, electrically conductive sponges 462b may be the type of electrically conductive sponges generally used for grounding. In addition to electrically conductive sponges, any suitable materials can be used to electrically connect the capacitive pads 451b and the exposed copper 463b, such as metal screws, metal clips, flexible printed circuit boards (PCBs), etc. In the example of FIG. 4B, the lid 460b can be made of plastic or other non-conductive materials, but in other examples, the lid 460b may be made of metal.

According to certain aspects, one or more other metal layers may be between the lid 460b and the PCBA 461b. For instance, such metal layers may function as heat sinks in an external SSD to manage thermal requirements. In an example, an external SSD can include various types of layers, which may include a lid, a nano carbon copper tape (NCCT), a foam, an aluminum heat sink (HS), a thermal interface material (TIM), and a PCBA. Similar layers may be included on either side of the PCBA. For instance, an external SSD can include a top lid, a top NCCT, a top foam, a top aluminum HS, a top TIM, a PCBA, a bottom TIM, a bottom aluminum HS, a bottom foam, a bottom NCCT, and a bottom lid. A number of layers can be metal layers or layers including metal, such as the NCCT, aluminum HS, TIM, etc.

If there are one or more other metal layers between the lid and the PCBA, the metal containing layers can affect electric fields of the capacitive pads in the lid. Accordingly, calibration can be performed for the external SSD to determine capacitive values for the capacitive pads in an initial state (e.g., upon being connected or coupled to a host). For instance, the aluminum HS can be grounded and affect electric fields of the capacitive pads. Calibration can be performed when the external SSD is plugged in to the host to determine capacitance values for the capacitive pads and set these values as ground zero or reference values. Subsequently, fluctuations in capacitance values of the capacitive pads from the ground zero values can be used to determine whether a user gesture is detected. In this way, presence of metal containing layers close to the capacitive pads may be accounted for in detecting user gestures. In some cases, one or more of the other metal layers between the lid and the PCBA may be removed if not needed for thermal requirements to reduce interference of these layers with electric fields of the capacitive pads in the lid.

Figure 4C:
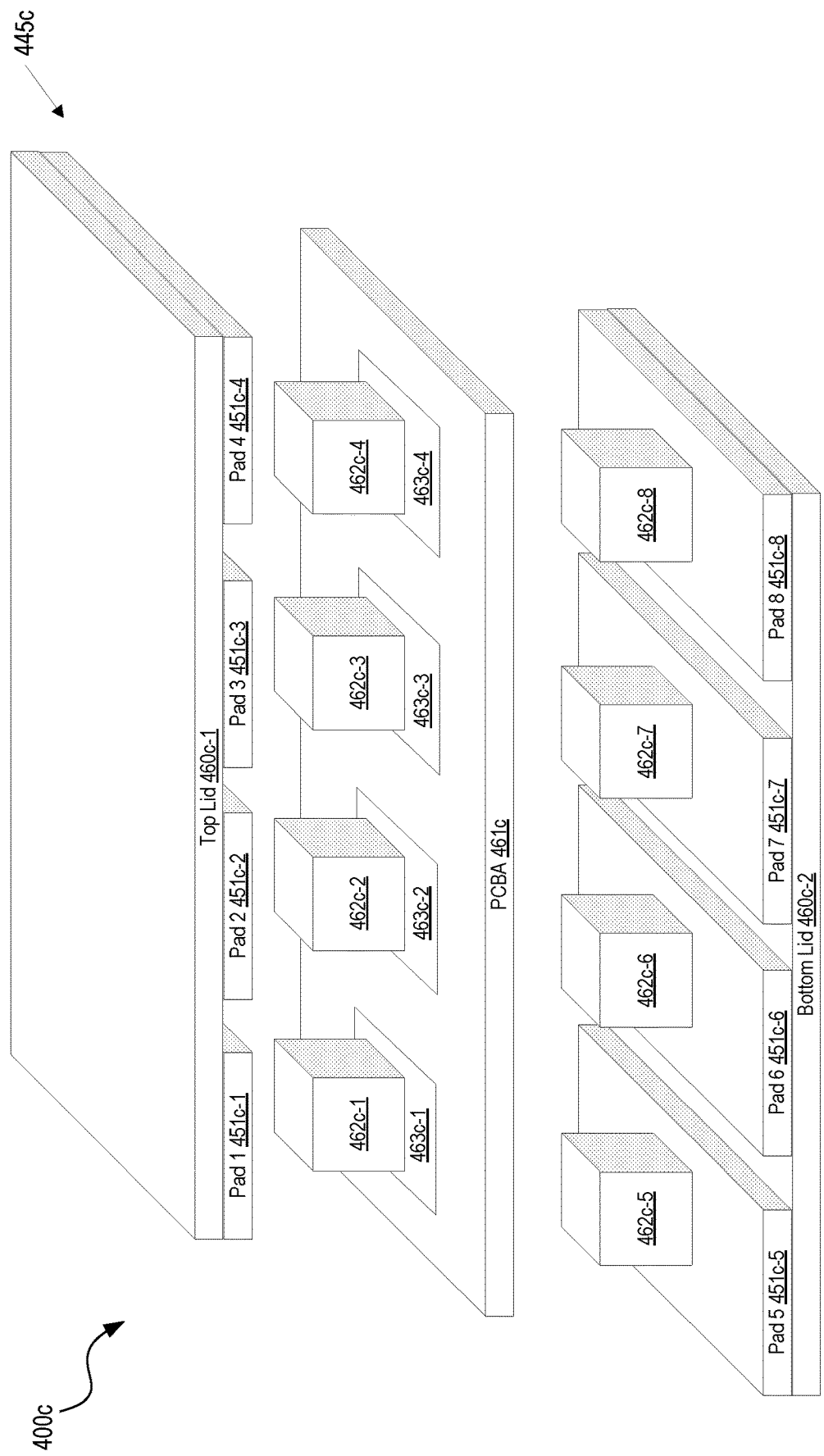
FIG. 4C is a block diagram illustrating an example storage device for providing multi-channel capacitive sensors for detecting gesture-based commands, in accordance with one or more embodiments.

FIG. 4C is a block diagram 400c illustrating an example storage device 445c for providing multi-channel capacitive sensors for detecting gesture-based commands, in accordance with certain embodiments. In some embodiments, components of FIG. 4C can be similar to components of FIGS. 1-4B having similar names and/or reference numbers. For example, the storage device 445c can be similar to the storage device 145, 245, 345, 445a, 445b in FIGS. 1-4B. Certain details relating to the block diagram 400c are described above in connection with FIGS. 1-4B.

The example of FIG. 4C can be similar to the example of FIG. 4B, but in the example of FIG. 4C, the storage device 445c can include a top lid 460c-1 and a bottom lid 460c-2, and capacitive pads 451c can be implemented in or near the top lid 460c-1 as well as the bottom lid 460c-2. For instance, a heat sink in or near the bottom lid 460c-2 can be used to form additional capacitive pads 451c. In the example of FIG. 4C, the top lid 460c-1 includes Pad 1 451c-1, Pad 2 451c-2, Pad 3 451c-3, and Pad 4 451c-4; the bottom lid 460c-2 includes Pad 5 451c-5, Pad 6 451c-6, Pad 7 451c-7, and Pad 8 451c-8. The metal pieces forming the capacitive pads 451c are electrically isolated from each other. The capacitive pads 451c can be electrically connected to exposed copper on a PCBA 461c of the storage device 445c. For example, the capacitive pads 451c-1, c-2, c-3, c-4 can be connected to the exposed copper 463c-1, c-2, c-3, c-4 by electrically conductive sponges 462c-1, c-2, c-3, c-4, respectively. The capacitive pads 451c-5, c-6, c-7, c-8 can be connected to exposed copper (not shown) on the other side of the PCBA 461c by electrically conductive sponges 462c-5, c-6, c-7, c-8, respectively. The exposed copper (not shown) connected to the capacitive pads 451c-5, c-6, c-7, c-8 can be similar to the exposed copper 463c-1, c-2, c-3, c-4. Electrically conductive sponges are provided as an example, and other types of materials can be used to connect the capacitive pads 451c and the exposed copper on the PCBA 461c, including metal screws, metal clips, flexible PCB, etc.

Figure 4D:
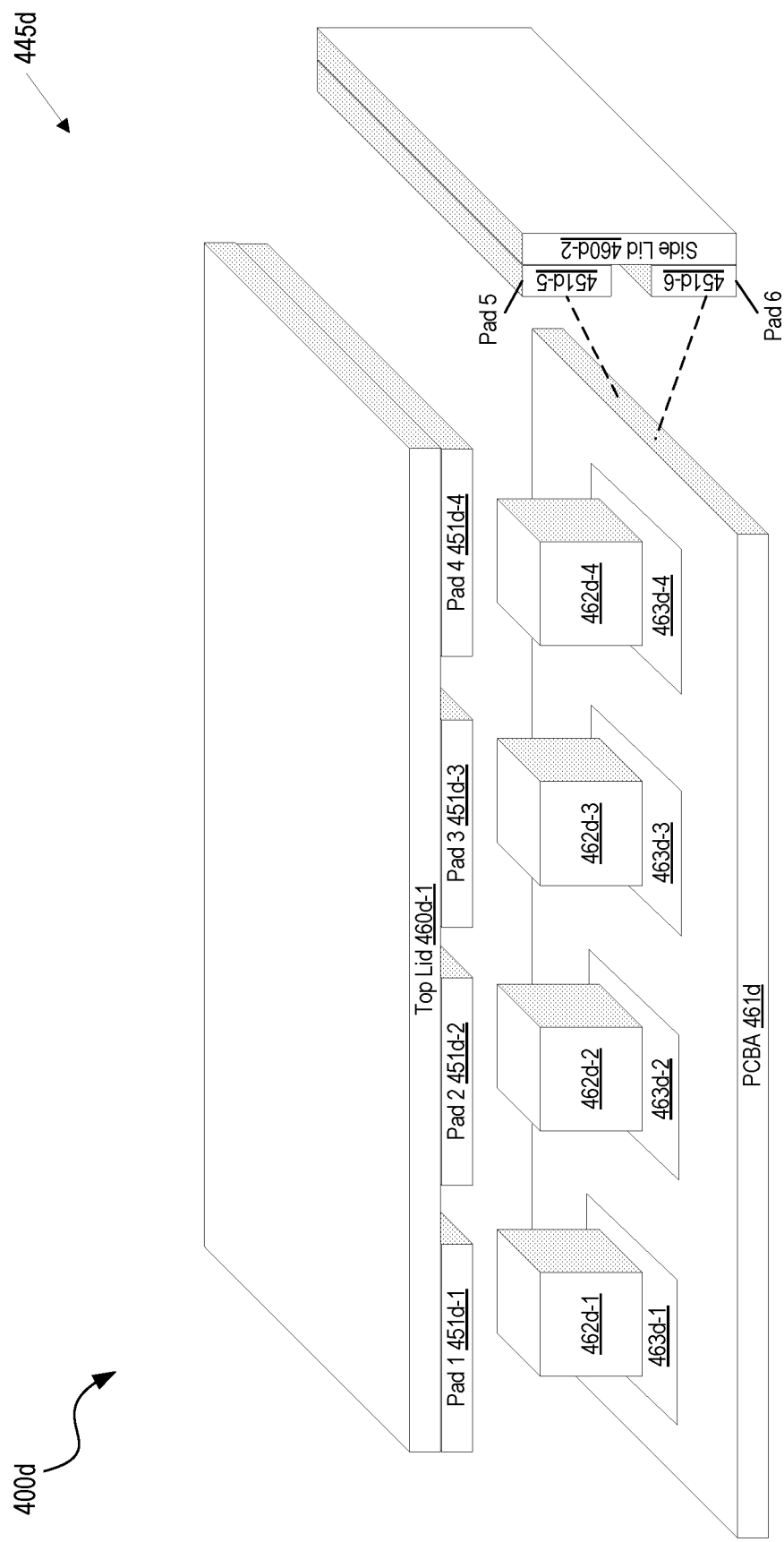
FIG. 4D is a block diagram illustrating an example storage device for providing multi-channel capacitive sensors for detecting gesture-based commands, in accordance with one or more embodiments.

FIG. 4D is a block diagram 400d illustrating an example storage device 445d for providing multi-channel capacitive sensors for detecting gesture-based commands, in accordance with certain embodiments. In some embodiments, components of FIG. 4D can be similar to components of FIGS. 1-4C having similar names and/or reference numbers. For example, the storage device 445d can be similar to the storage device 145, 245, 345, 445a, 445b, 445c in FIGS. 1-4C. Certain details relating to the block diagram 400d are described above in connection with FIGS. 1-4C.

The example of FIG. 4D can be similar to the example of FIG. 4B, but in the example of FIG. 4D, the storage device 445d can include a top lid 460d-1 and a side lid 460d-2, and capacitive pads 451d can be implemented in or near the top lid 460d-1 as well as the side lid 460d-2. For instance, a heat sink in or near the side lid 460c-2 can be used to form additional capacitive pads 451d. In the example of FIG. 4D, the top lid 460d-1 includes Pad 1 451d-1, Pad 2 451d-2, Pad 3 451d-3, and Pad 4 451d-4; the side lid 460d-2 includes Pad 5 451d-5 and Pad 6 451d-6. The side lid 460d-2 is shown to include two capacitive pads 451d-5, d-6 as an example, and the side lid 460d-2 can include any number of capacitive pads 451d. The capacitive pads 451d may be arranged in a series or in a matrix as appropriate. The metal pieces forming the capacitive pads 451d are electrically isolated from each other. The capacitive pads 451d-5, d-6 on the side lid 460d-2 can be electrically connected to a PCBA 461d of the storage device 445d, for example, on a side of the PCBA 461d. Electrical connections between the capacitive pads 451d-5, d-6 and the PCBA 461d are represented as dashed lines in the example of FIG. 4D, and any suitable connections or materials can be used, such as an electrically conductive sponges, metal screws, metal clips, flexible PCBs, etc. For instance, the capacitive pads 451d-5, d-6 may be connected to exposed copper on the side of the PCBA 461d using a suitable connection. The example of FIG. 4D shows one side lid 460d-2 for illustrative purposes, and capacitive pads 451d can be implemented in or near multiple side lids 460d-2. For instance, the storage device 445d may include heat sinks embedded in or near one or more side lids 460d-2 or on the sides to improve thermal management. In certain embodiments, the example of FIG. 4D can be implemented in connection with the example of FIG. 4C such that capacitive pads 451 using heat sinks can be implemented in or near the top lid, bottom lid, and side lids 460 of the storage device 445.

Figure 5B:
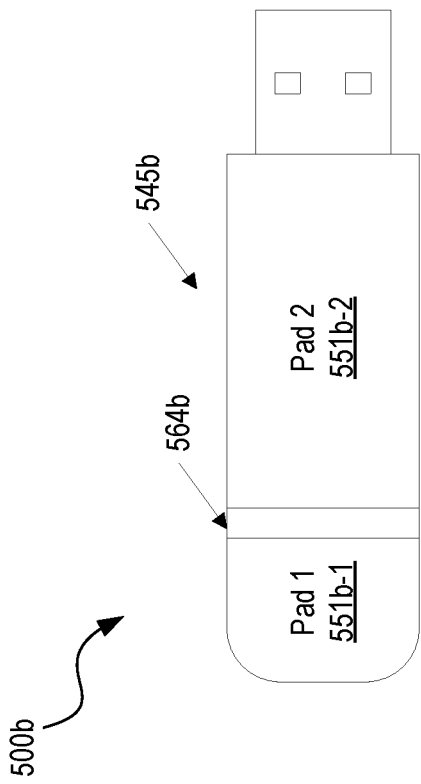
FIG. 5B is a block diagram illustrating an example storage device for providing multi-channel capacitive sensors for detecting gesture-based commands, in accordance with one or more embodiments.
Figure 5A:
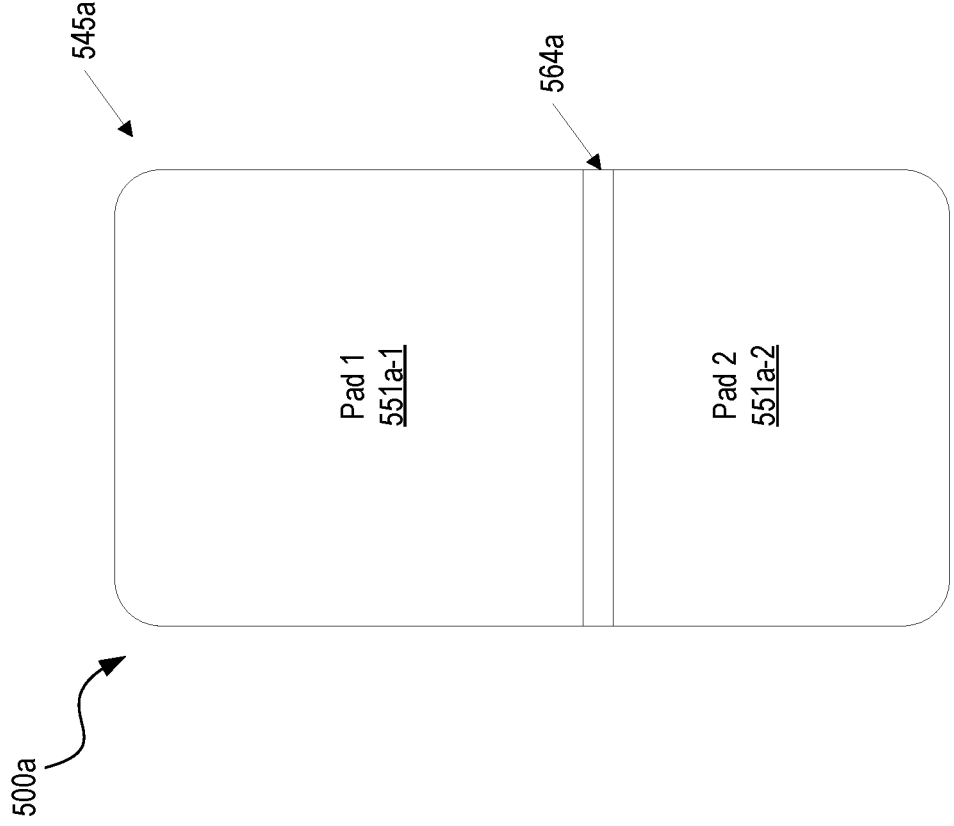
FIG. 5A is a block diagram illustrating an example storage device for providing multi-channel capacitive sensors for detecting gesture-based commands, in accordance with one or more embodiments.

FIG. 5A is a block diagram 500a illustrating an example storage device 545a for providing multi-channel capacitive sensors for detecting gesture-based commands, in accordance with certain embodiments. FIG. 5B is a block diagram 500b illustrating an example storage device 545b for providing multi-channel capacitive sensors for detecting gesture-based commands, in accordance with certain embodiments. FIG. 5C is a block diagram 500c illustrating an example storage device 545c for providing multi-channel capacitive sensors for detecting gesture-based commands, in accordance with certain embodiments. FIG. 5D is a block diagram 500d illustrating an example storage device 545d for providing multi-channel capacitive sensors for detecting gesture-based commands, in accordance with certain embodiments. In some embodiments, components of FIGS. 5A-5D can be similar to components of FIGS. 1-4D having similar names and/or reference numbers. For example, the storage device 545 can be similar to the storage device 145, 245, 345, 445 in FIGS. 1-4D. Certain details relating to the block diagram 500a, 500b, 500c, 500d are described above in connection with FIGS. 1-4D.

In some embodiments, the lid of a storage device 545 may be made of metal and can be used to form capacitive pads 551 of a multi-channel capacitive sensor in the storage device 545. FIG. 5A shows a storage device 545a that is an external SSD, and FIG. 5B shows a storage device 545b that is a USB flash drive. In the example of FIG. 5A, the storage device 545a includes two (2) capacitive pads or electrodes 551a formed from pieces of the metal lid. The storage device 545a includes Pad 1 551a-1 and Pad 2 551a-2, which are partitioned by an insulating piece 564a. The insulating piece 564a can be made of plastic or any other suitable material. The insulating piece 564a can electrically isolate the capacitive pads 551a. Similarly, in the example of FIG. 5B, the storage device 545b includes two (2) capacitive pads or electrodes 551b formed from pieces of the metal lid. The storage device 545b includes Pad 1 551b-1 and Pad 2 551b-2, which are partitioned by an insulating piece 564b. The insulating piece 564b can be made of plastic or any other suitable material. The insulating piece 564b can electrically isolate the capacitive pads 551b. As an example, the insulating piece 564 may be a transparent or translucent piece, for instance, through which light-emitting diode (LED) lighting shows. Two capacitive pads 551 are shown as an example, and the storage device 545 can include any number of capacitive pads. In some cases, capacitive pads made from a metal lid can be useful for USB drives since USB drives tend to be small and mostly made of metal. As described in connection with other examples, the storage devices 545 may also include other metal layers or materials that affect electric fields of capacitive pads 551 and perform calibration as appropriate.

FIGS. 5C-5D are similar to FIGS. 5A-5B, respectively, but show four (4) capacitive pads or electrodes 551. FIG. 5C shows a storage device 545c that is an external SSD. Capacitive pads 551c-1, c-2, c-3, c-4 may be arranged in series and can be electrically isolated by insulating pieces 564c-1, c-2, c-3. FIG. 5D shows a storage device 545d that is a USB flash drive. Capacitive pads 551d-1, d-2, d-3, d-4 may be arranged in series and can be electrically isolated by insulating pieces 564d-1, d-2, d-3. The capacitive pads 551c, 551d may also be arranged in a matrix. One or more insulating pieces 564c, 564d may partition the capacitive pads 551c, 551d. An insulating piece 564 can be linear or have any suitable shape for partitioning the capacitive pads 551. As an example, a cross-shaped insulating piece 564c, 564d may isolate the capacitive pads 551c, 551d into a two-by-two (2×2) matrix.

Storage devices for providing multi-channel capacitive sensors for detecting gesture-based commands can enable data requests or operations without a user having to provide a command through a host. The user can directly initiate data requests or operations through the storage devices using gestures. In addition, gestures may also be used to facilitate user interaction with storage devices for performing different types of authentication, such as FIDO, Bluetooth, etc. In this manner, the storage devices for providing multi-channel capacitive sensors for detecting gesture-based commands can make it easy and seamless for users to perform various functionalities associated with the storage devices. Moreover, by implementing capacitive pads of a multi-channel capacitive sensor within a storage device using pieces of a heat sink, the storage devices can remain compact and manage thermal requirements. Examples described herein are provided for illustrative purposes, and many variations are possible. Features described in connection with various embodiments and/or examples may be implemented separately or in combination.

Figure 6:
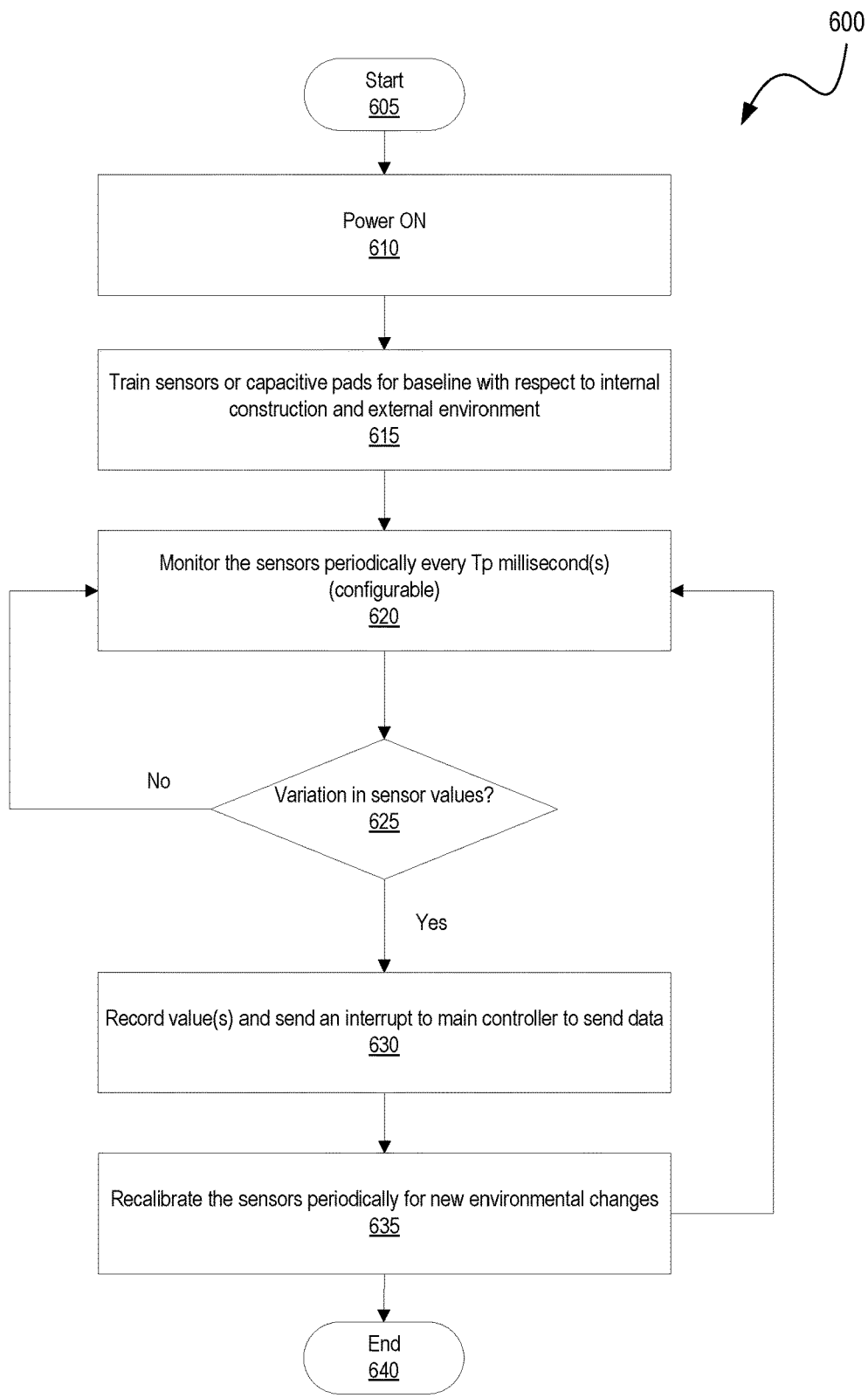
FIG. 6 illustrates a workflow process for performing capacitive sensor calibration in a data storage device, in accordance with one or more embodiments.

FIG. 6 illustrates a workflow process 600 for performing capacitive sensor calibration in a data storage device, in accordance with one or more embodiments. The workflow process 600 may be implemented by a storage system or a storage device, such as a storage system 140 or a storage device 145, 245, 345, 445, 545 in FIGS. 1-5D. For example, the workflow process 700 may be performed in part or in whole by a controller and/or a multi-channel capacitive sensor of a storage device. For illustrative purposes, the process 600 is explained below in connection with the storage device 245 in FIG. 2. Certain details relating to the process 600 are explained in more detail with respect to FIGS. 1-5D. Depending on the embodiment, the process 600 may include fewer or additional blocks, and the blocks may be performed in an order that is different from illustrated.

The process 600 starts at block 605. The process 600 may be performed in part or in whole by the controller 246, the capacitive sensor chip 250, and or another component of the storage device 245. At block 610, power is turned on for the storage device 245. At block 615, the storage device 245 can train sensors or capacitive pads 251 for baseline with respect to internal construction and external environment of the storage device 245. At block 620, the storage device 245 can monitor the sensors periodically every threshold or time period Tp. Tp can be configured and can be specified in any appropriate unit of time. For instance, Tp can be specified in milliseconds. At block 625, if there are variations in sensor values, the storage device 245 can record value(s) and send an interrupt to a main controller to send data, at block 630. For example, the capacitive sensor chip 250 can record sensor values and send an interrupt to the controller 246. At block 625, if there are no variations in sensor values, the process 600 can return to block 620. At block 635, the storage device 245 can recalibrate the sensors periodically for new environmental changes. The process 600 can return to block 620. The process 600 ends at block 640.

Figure 7:
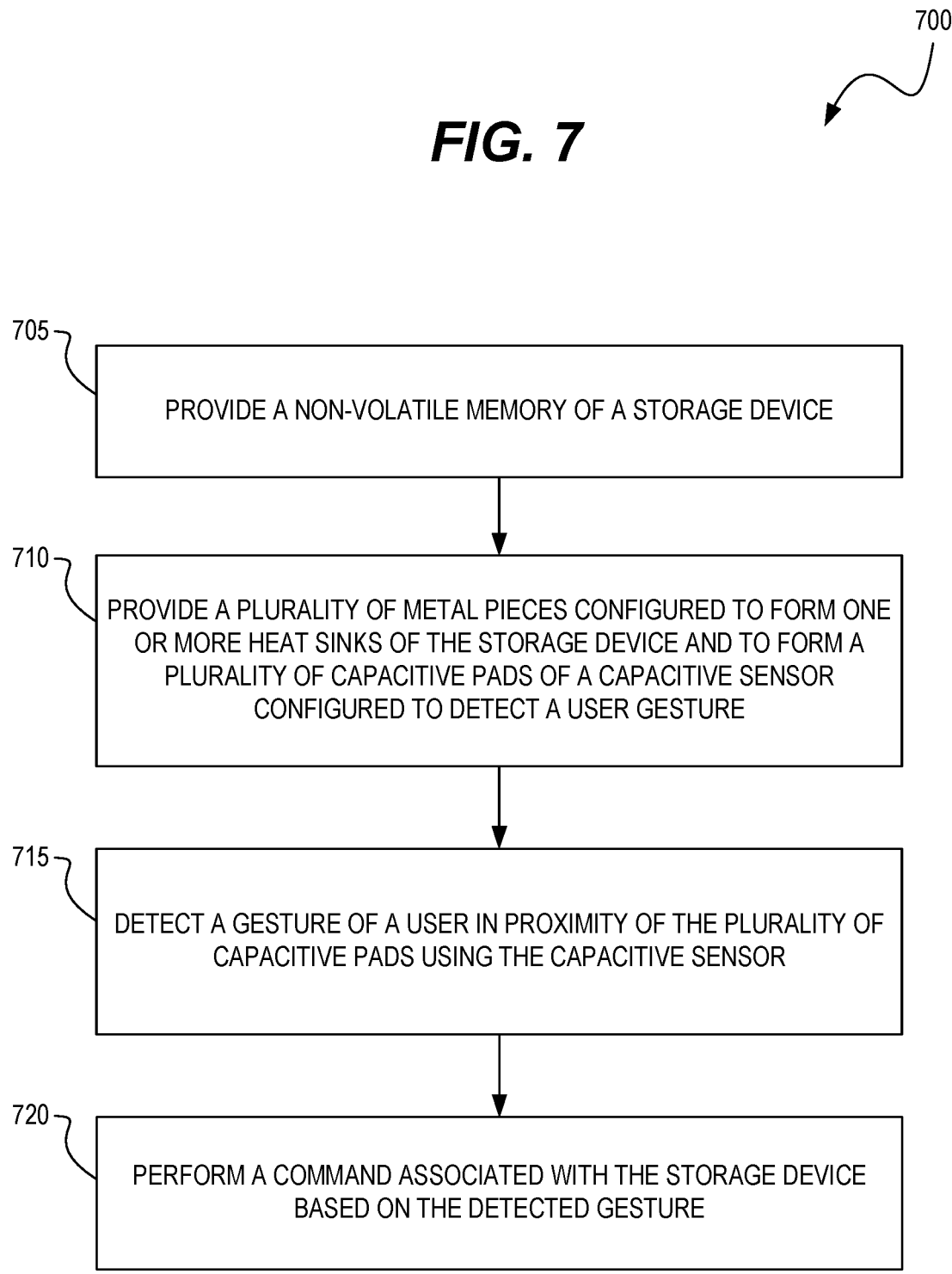
FIG. 7 illustrates a workflow process for providing multi-channel capacitive sensors for detecting gesture-based commands in a data storage device, in accordance with one or more embodiments.

FIG. 7 illustrates a workflow process 700 for providing multi-channel capacitive sensors for detecting gesture-based commands in a data storage device, in accordance with one or more embodiments. The workflow process 700 may be implemented by a storage system or a storage device, such as a storage system 140 or a storage device 145, 245, 345, 445, 545 in FIGS. 1-5D. For example, the workflow process 700 may be performed in part or in whole by a controller and/or a multi-channel capacitive sensor of a storage device. For illustrative purposes, the process 700 is explained below in connection with the storage device 245 in FIG. 2. Certain details relating to the process 700 are explained in more detail with respect to FIGS. 1-6. Depending on the embodiment, the process 700 may include fewer or additional blocks, and the blocks may be performed in an order that is different from illustrated.

At block 705, the storage device 245 can provide a non-volatile memory. For example, the non-volatile memory can store data of the storage device 245.

At block 710, the storage device 245 can provide a plurality of metal pieces configured to form one or more heat sinks of the storage device 245 and to form a plurality of capacitive pads 251 of a capacitive sensor configured to detect a user gesture. For instance, the capacitive sensor can be configured to detect a user gesture, and the capacitive sensor can include a plurality of capacitive pads 251 that are formed from a plurality of metal pieces that form one or more heat sinks of the storage device 245. In some embodiments, the capacitive sensor is a multi-channel capacitive sensor. In certain embodiments, the plurality of capacitive pads 251 can be embedded in or placed underside a lid of the storage device 245. For example, the lid can be made of plastic or another non-conductive material. In other embodiments, the plurality of capacitive pads 251 forms a metal lid of the storage device 245. The storage device 245 can be one or more of: an external solid state drive (SSD), a Universal Serial Bus (USB) flash drive, a Secure Digital (SD) card, or a Micro Secure Digital (uSD) card. In an example, the plurality of capacitive pads 251 is arranged in a row. In another example, the plurality of capacitive pads 251 is arranged in a matrix.

At block 715, the storage device 245 can detect a gesture of a user in proximity of the plurality of capacitive pads 251 using the capacitive sensor. In some embodiments, the gesture is associated with a command to perform an operation relating to Fast Identity Online (FIDO) authentication. In certain embodiments, the gesture is associated with a command to perform an operation relating to Bluetooth-based authentication. In an embodiment, the gesture is associated with a command to perform a full file copy of data from the storage device 245 to a host. In another embodiment, the gesture is associated with a command to perform a full backup of data from a host to the storage device 245. Examples of gestures can include a left-to-right swipe, a right-to-left swipe, a top-to-bottom swipe, a bottom-to-top swipe, etc.

At block 720, the storage device 245 can perform a command associated with the storage device 245 based on the detected gesture.

In some embodiments, the storage device 245 includes one or more additional metal layers or metal materials within the storage device 245 other than the plurality of capacitive pads 251. The storage device 245 can be further configured to perform calibration to determine initial capacitance values of the plurality of capacitive pads 251 in response to the storage device 245 being coupled to a host.

Figure 8:
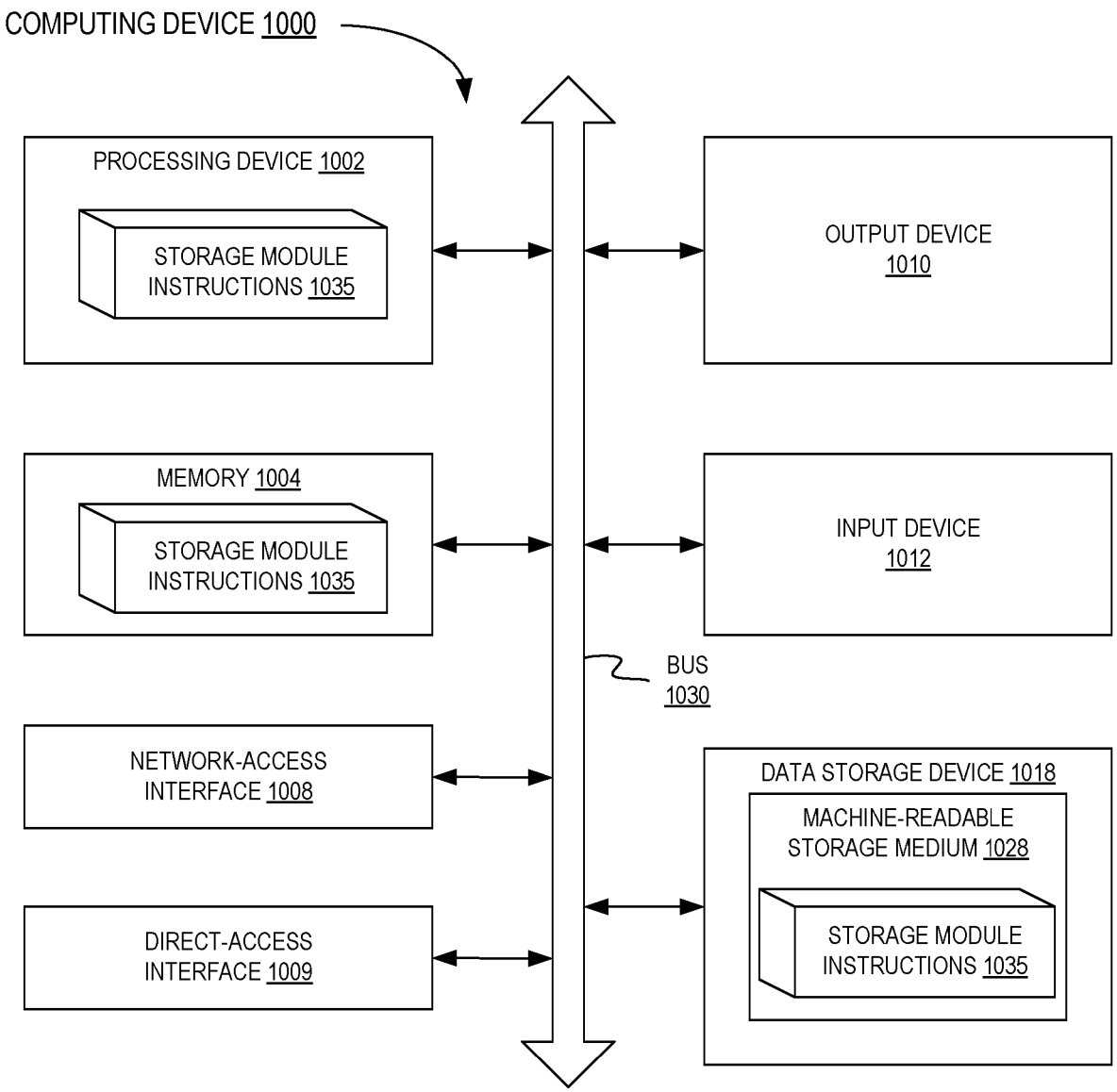
FIG. 8 is a diagram of a computing device, in accordance with one or more embodiments.

FIG. 8 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device 1002 (e.g., a processor, a controller, a central processing unit (CPU), etc.), a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network (e.g., network 120 illustrated in FIG. 1). The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
a non-volatile memory;
an enclosure, wherein the enclosure comprises a top lid, a bottom lid, and a plurality of side lids;
one or more heat sinks, wherein a portion of the one or more heat sinks are used to form a plurality of capacitive pads of a capacitive sensor configured to detect a user gesture, wherein the one or more heat sinks are embedded along the top lid or the bottom lid and at least one side lid of the plurality of side lids;
a printed circuit board assembly (PCBA) disposed between the top lid and the bottom lid;
one or more pieces of insulating material embedded along the top lid or the bottom lid and at least one side lid of the plurality of side lids, wherein the embedded one or more heat sinks are partitioned into the plurality of capacitive pads using the one or more pieces of insulating material to electrically insulate each of the one or more heat sinks from each other; and
a controller configured to:
detect a gesture of a user in proximity of the plurality of capacitive pads using the capacitive sensor; and
perform a command associated with the data storage device based on the detected gesture.

2. The data storage device of claim 1, wherein the capacitive sensor is a multi-channel capacitive sensor.

3. The data storage device of claim 1, wherein the lid is made of plastic or another non-conductive material.

4. The data storage device of claim 1, wherein the plurality of capacitive pads forms a metal lid of the data storage device.

5. The data storage device of claim 1, wherein the gesture is associated with a command to perform an operation relating to Fast Identity Online (FIDO) authentication.

6. The data storage device of claim 1, wherein the gesture is associated with a command to perform an operation relating to Bluetooth-based authentication.

7. The data storage device of claim 1, wherein the gesture is associated with a command to perform a full file copy of data from the data storage device to a host.

8. The data storage device of claim 1, wherein the gesture is associated with a command to perform a full backup of data from a host to the data storage device.

9. The data storage device of claim 1, wherein the data storage device includes one or more additional metal layers or metal materials within the data storage device other than the plurality of capacitive pads.

10. The data storage device of claim 9, wherein the controller or the capacitive sensor is further configured to perform calibration to determine initial capacitance values of the plurality of capacitive pads in response to the data storage device being coupled to a host.

11. The data storage device of claim 1, wherein the data storage device is one or more of: an external solid state drive (SSD), a Universal Serial Bus (USB) flash drive, a Secure Digital (SD) card, or a Micro Secure Digital (uSD) card.

12. The data storage device of claim 1, wherein the plurality of capacitive pads is arranged in a row on a surface of the lid of the data storage device.

13. The data storage device of claim 1, wherein the plurality of capacitive pads is arranged in a matrix on a surface of the lid of the data storage device, wherein the matrix has multiple rows.

14. The data storage device of claim 1, wherein the plurality of capacitive pads is arranged in two or more layers, the two or more layers disposed between the lid and a bottom lid of the data storage device.

15. A method of processing data requests in a data storage device, the method comprising:
providing a non-volatile memory;
providing an enclosure, wherein the enclosure comprises a top lid, a bottom lid, and a plurality of side lids;
providing one or more heat sinks, wherein a portion of the one or more heat sinks is used to form a plurality of capacitive pads of a capacitive sensor configured to detect a user gesture, wherein the one or more heat sinks are embedded along the top lid or the bottom lid and at least one side lid of the plurality of side lids;
providing a printed circuit board assembly (PCBA) disposed between the top lid and the bottom lid;
providing one or more pieces of insulating material embedded along the top lid or the bottom lid and at least one side lid of the plurality of side lids, wherein the embedded one or more heat sinks are partitioned into the plurality of capacitive pads using the one or more pieces of insulating material to electrically insulate each of the one or more heat sinks from each other;
detecting a gesture of a user in proximity of the plurality of capacitive pads using the capacitive sensor; and
performing a command associated with the data storage device based on the detected gesture.

16. The method of claim 15, wherein the capacitive sensor is a multi-channel capacitive sensor.

17. The method of claim 15, wherein the lid is made of plastic or another non-conductive material.

18. The method of claim 15, wherein the plurality of capacitive pads forms a metal lid of the data storage device.

19. A data storage device comprising:
a non-volatile memory;
an enclosure, wherein the enclosure comprises a top lid, a bottom lid, and a plurality of side lids;
one or more heat sinks, wherein the one or more heat sinks is used to form a plurality of capacitive pads of a capacitive sensor configured to detect a user gesture, wherein the one or more heat sinks are embedded along the top lid or the bottom lid and at least one side lid of the plurality of side lids;

a printed circuit board assembly (PCBA) disposed between the top lid and the bottom lid;

one or more pieces of insulating material embedded along the top lid or the bottom lid and at least one side lid of the plurality of side lids, wherein the embedded one or more heat sinks are partitioned into the plurality of capacitive pads using the one or more pieces of insulating material to electrically insulate each of the one or more heat sinks from each other; and a controller means configured to:
   detect a gesture of a user in proximity of the plurality of capacitive pads using the capacitive sensor; and
   perform a command associated with the data storage device based on the detected gesture.

* * * * *